(12) United States Patent
Suzuki et al.

(10) Patent No.: US 11,450,856 B2
(45) Date of Patent: Sep. 20, 2022

(54) CARBON FOAM, STACK CARBON FOAM, AND METHOD OF MANUFACTURING STACK CARBON FOAM

(71) Applicant: ASAHI KASEI KABUSHIKI KAISHA, Tokyo (JP)

(72) Inventors: Atsushi Suzuki, Tokyo (JP); Junya Yamashita, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 131 days.

(21) Appl. No.: 16/649,980

(22) PCT Filed: Aug. 21, 2018

(86) PCT No.: PCT/JP2018/030845
§ 371 (c)(1),
(2) Date: Mar. 24, 2020

(87) PCT Pub. No.: WO2019/069570
PCT Pub. Date: Apr. 11, 2019

(65) Prior Publication Data
US 2020/0243866 A1 Jul. 30, 2020

(30) Foreign Application Priority Data
Oct. 5, 2017 (JP) .............................. JP2017-195416

(51) Int. Cl.
*H01M 4/66* (2006.01)
*H01M 4/80* (2006.01)
(Continued)

(52) U.S. Cl.
CPC ............. *H01M 4/663* (2013.01); *C01B 32/05* (2017.08); *H01M 4/667* (2013.01); *H01M 4/808* (2013.01); *H01M 8/188* (2013.01)

(58) Field of Classification Search
CPC ..................................................... H01M 4/663
See application file for complete search history.

(56) References Cited

U.S. PATENT DOCUMENTS

2006/0086043 A1 4/2006 Miller et al.
2007/0281162 A1 12/2007 Matviya
(Continued)

FOREIGN PATENT DOCUMENTS

JP  S61270268 A  11/1986
JP  S6294830 U   6/1987
(Continued)

OTHER PUBLICATIONS

Apr. 8, 2020, International Preliminary Report on Patentability issued in the International Patent Application No. PCT/JP2018/030845.
(Continued)

*Primary Examiner* — Brian R Ohara
(74) *Attorney, Agent, or Firm* — Kenja IP Law PC

(57) ABSTRACT

It is an object of the present disclosure to provide a thin-film carbon foam and a method of manufacture the same. It is another object of the present disclosure to provide a stack carbon foam having fewer through holes and a method of manufacturing the same. The carbon foam of the present disclosure is, for example, a stack carbon foam being a stack of at least two monolayer carbon foams stacked one another, each monolayer carbon foam comprising linear portions and node portions joining the linear portions, or a carbon foam comprising linear portions and node portions joining the linear portions, wherein the ratio of the number of large through holes having a diameter of 1 mm or more to the surface area of the carbon foam is $0.0003/mm^2$ or less.

13 Claims, 3 Drawing Sheets

(51) Int. Cl.
*H01M 8/18* (2006.01)
*C01B 32/05* (2017.01)

(56) References Cited

U.S. PATENT DOCUMENTS

| | | | | |
|---|---|---|---|---|
| 2007/0281163 A1* | 12/2007 | Matviya | ............... | C04B 35/52 |
| | | | | 428/408 |
| 2015/0236543 A1* | 8/2015 | Brushett | ............... | H01M 8/188 |
| | | | | 429/81 |
| 2017/0352868 A1* | 12/2017 | Zhamu | ............... | H01M 4/133 |
| 2018/0104380 A1* | 4/2018 | Miller | ............... | A61L 27/56 |

FOREIGN PATENT DOCUMENTS

| | | |
|---|---|---|
| JP | S62132717 A | 6/1987 |
| JP | S62162611 A | 7/1987 |
| JP | H04349178 A | 12/1992 |
| JP | H09167621 A | 6/1997 |
| JP | 2002326871 A | 11/2002 |
| JP | 2002338372 A | 11/2002 |
| JP | 2004107106 A | 4/2004 |
| JP | 2004217446 A | 8/2004 |
| JP | 2006117507 A | 5/2006 |

OTHER PUBLICATIONS

Aug. 12, 2020, the Supplementary European Search Report issued by the European Patent Office in the corresponding European Patent Application No. 18865273.9.

Nov. 20, 2018, International Search Report issued in the International Patent Application No. PCT/JP2018/030845.

* cited by examiner

CARBON FOAM, STACK CARBON FOAM, AND METHOD OF MANUFACTURING STACK CARBON FOAM

TECHNICAL FIELD

The present disclosure relates to a carbon foam, a stack carbon foam, and a method of manufacturing a stack carbon foam.

BACKGROUND

A carbon foam is a material obtained, for example, by heat treating and carbonizing a melamine resin expanded body (foam) in an inert gas atmosphere (for example, see JP H04-349178 A (PTL 1)), and it is used for various applications because of its porosity, flexibility and electrical properties. A carbon foam is significantly different from a commonly-used carbon fiber nonwoven fabric in that a carbon foam has a smaller fiber diameter, so that its specific surface area is large, and that the carbon foam has an integral structure in which all the fibers are connected.

For example, JP 2002-326871 A (PTL 2) describes a usage of a carbon foam as a filter which under special conditions such as high temperatures or drug uses. In addition, JP 2004-217446 A (JPL 3) describes a usage of a carbon foam as a heat insulating material having high heat insulating properties even at high temperatures. Furthermore, JP H09-167621 A (PTL 4) describes using carbon foam as an electrode having a high electrical activity and conductivity.

CITATION LIST

Patent Literature

PTL 1: JP H04-349178 A
PTL 2: JP 2002-326871 A
PTL 3: JP 2004-217446 A
PTL 4: JP H09-167621 A

SUMMARY

Technical Problem

In the meantime, when a carbon material is used as an electrode, a carbon fiber material in the form of a thin film may be required for reducing the resistivity. In such cases, carbon fiber sheets with thicknesses of about 300 μm (such as Torayca Paper manufactured by Toray Industries, Inc. and GDL39-AA manufactured by SGL Carbon), which are produced by stacking carbon fibers and processing the stack into a sheet, are often used, and porous carbon foams have been rarely used.

One of the reasons why carbon foams have not been used is that manufacturing thin carbon foams from resin foams as the raw materials are difficult.

For example, it has been difficult to manufacture carbon foams disclosed in PTLs 1 to 4 in the form of thin films. In addition, carbon foams with an even smaller number of through holes are demanded at present.

It is therefore an object of the present disclosure to provide a thin-film carbon foam and a method of manufacturing the same. It is another object of the present disclosure to provide a stack carbon foam having fewer through holes and a method of manufacturing the same.

Solution to Problem

We have intensively studied approaches to solve the above-mentioned problems. Two approaches are possibly employed in order to achieve a reduction in the thickness of a carbon foam made from an expanded resin foam as a raw material.

One approach is to press a resin foam by a press machine into a thin-film sample. As an example of this approach, PTL 2 discloses an example in which a thermosetting resin is impregnated into an expanded melamine resin foam, which is compressed to a thickness by a factor of 10 at maximum. The compression ratio of a foam by this approach, however, is limited. Specifically, compression into a certain degree of thickness or thinner destroys the internal structure of a foam, making a reduction in the thickness to the certain degree or smaller difficult.

Another approach is to use a thin-film raw material. A problem with this approach is that penetrating defects in a raw material resin foam makes the carbon fiber sheet to be easily torn, which significantly lowers the handleability.

An expanded resin foam as a raw material has randomly opened fine holes in various diameters generated during expansion. For example, a melamine resin foam has holes of about 1 to 3 mm in diameter as majority of holes, and there are even holes having a diameter of about 5 mm. Thus, when the raw material is thinned to a thickness of 2 to 3 mm, completely penetrating defects (through holes) appear, and in a raw material with a thickness of 1 mm or less, penetrating defects appear everywhere. We conducted studies, and discovered that such penetrating defects caused adverse effects on the physical properties after carbonization.

This finding led to a sheet carbon foam in a thin film having a high handleability by using a thin-film expanded resin foam having a quite few penetrating defects.

We have diligently studied in search for an approach to remarkably reduce penetrating defects in an expanded resin foam as a raw material. As a result, we have found that random penetrating defects can be compensated for each other by laminating two or more thin raw material films, thereby completing the present disclosure.

Solution to Problem

Specifically, the present disclosure provides the following.

[1] A stack carbon foam being a stack of at least two monolayer carbon foams stacked one another, each monolayer carbon foam comprising linear portions and node portions joining the linear portions.

[2] The stack carbon foam according to [1], wherein the stack carbon foam comprises a through hole penetrating through the stack carbon foam, and at a contact surface in which two adjacent monolayer carbon foams contact to each other, an outer edge of the through hole in one monolayer carbon foam at the contact surface is misaligned with an outer edge of the through hole in another monolayer carbon foam at the contact surface, in a cross section in a thickness direction of the stack carbon foam.

[3] The stack carbon foam according to [1] or [2], wherein the stack carbon foam comprises a hole not penetrating through the stack carbon foam, in two adjacent monolayer carbon foams contacting to each other, the hole extending from a surface of one monolayer carbon foam to a contact surface of the one monolayer carbon foam and another monolayer carbon foam, and terminating at the contact surface, in the cross section in the thickness direction of the stack carbon foam.

The carbon foam according to any one of [1] to [3] may satisfy the following requirements according to [4] to [10].

[4] A carbon foam comprising linear portions and node portions joining the linear portions, wherein a ratio of the number of large through holes having a diameter of 1 mm or more to a surface area of the carbon foam is 0.0003/mm² or less.

[5] The carbon foam of [4], wherein the carbon foam has a thickness of 0.01 mm or more and 5.0 mm or less.

[6] The carbon foam of [4], wherein the thickness of the carbon foam is 0.01 mm or more and 0.5 mm or less.

[7] The carbon foam according to any one of [4] to [6], wherein the carbon foam has an area of 60 mm×60 mm or greater in which the ratio of the number of large through holes having a diameter of 1 mm or more to the surface area of the carbon foam is 0.0003/mm² or less.

[8] The carbon foam according to any one of [4] to [6], wherein the carbon foam has an area of 100 mm×100 mm or greater in which the ratio of the number of large through holes having a diameter of 1 mm or more to the surface area of the carbon foam is 0.0003/mm² or less.

[9] The carbon foam according to any one of [4] to [6], wherein the carbon foam has an area of 200 mm×200 mm or greater in which the ratio of the number of large through holes having a diameter of 1 mm or more to the surface area of the carbon foam is 0.0003/mm² or less.

[10] The carbon foam according to any one of [4] to [6], wherein the thickness of the carbon foam is 0.01 mm or more and 0.5 mm or less, and the carbon foam has an area of 60 mm×60 mm or greater in which the ratio of the number of large through holes having a diameter of 1 mm or more to the surface area of the carbon foam is 0.0003/mm² or less.

The carbon foam according to any one of [4] to [10] may satisfy the above-mentioned requirements according to [1] to [3].

[11] The stack carbon foam or carbon foam according to any one of [1] to [10], wherein a ratio of the number of the linear portions to the number of the node portions is 1.2 or more and 1.7 or less.

[12] The stack carbon foam or carbon foam according to [11], wherein the ratio of the number of the linear portions to the number of the node portions is 1.4 or more and 1.6 or less.

[13] The stack carbon foam or carbon foam according to any one of [1] to [12], wherein a difference $\theta_c$ between the largest value and the second largest value of $\theta avex$, $\theta avey$, and $\theta avez$ is 3° or more, where, for linear portions included in a region of 300 μm×300 μm×300 μm, an average value of orientation angles with respect to an x direction is defined as $\theta avex$, an average value of orientation angles with respect to a y direction is defined as $\theta avey$, and an average value of orientation angles with respect to a z direction is defined as $\theta avez$, where the thickness direction of the carbon foam is defined as the x direction, a direction perpendicular to the x direction is defined as the y direction, and a direction perpendicular to the x direction and the y direction is defined as the z direction.

[14] The stack carbon foam or carbon foam according to any one of [1] to [13], comprising a region having a density of the node portions of 15,000/mm³ or more.

[15] The stack carbon foam or carbon foam according to any one of [1] to [14], wherein a ratio of oxygen atoms determined by a surface analysis by X-ray fluorescence spectroscopy is 0.03% by mass to 10% by mass.

[16] The stack carbon foam or carbon foam according to any one of [1] to [15], wherein a carbon content is 51% by mass or more.

[17] The stack carbon foam or carbon foam according to any one of [1] to [16], formed into a sheet.

[18] An electrode for a redox flow battery comprising the stack carbon foam or carbon foam according to any one of [1] to [17].

[19] A method of manufacturing a stack carbon foam, comprising:

stacking and pressing a first resin foam and a second resin foam to form a stack resin foam; and carbonizing the stack resin foam to manufacture a stack carbon foam being a stack of a first monolayer carbon foam comprising linear portions and node portions joining the linear portions, and a second monolayer carbon foam comprising linear portions and node portions joining the linear portions.

The carbon foam obtained by [19] may satisfy the above-mentioned requirements according to [1] to [18].

[20] A method of manufacturing a stack carbon foam, comprising:

stacking a first monolayer carbon foam comprising linear portions and node portions joining the linear portions, and a second monolayer carbon foam comprising linear portions and node portions joining the linear portions, to form a stack; and pressing the stack to manufacture a stack carbon foam.

The carbon foam obtained by [20] may satisfy the above-mentioned requirements according to [1] to [18].

Advantageous Effect

According to the present disclosure, a thin-film carbon foam and a method of manufacturing the same can be provided. In addition, provided are a stack carbon foam having fewer through holes and a method of manufacturing the same.

DETAILED DESCRIPTION

Figure 1:
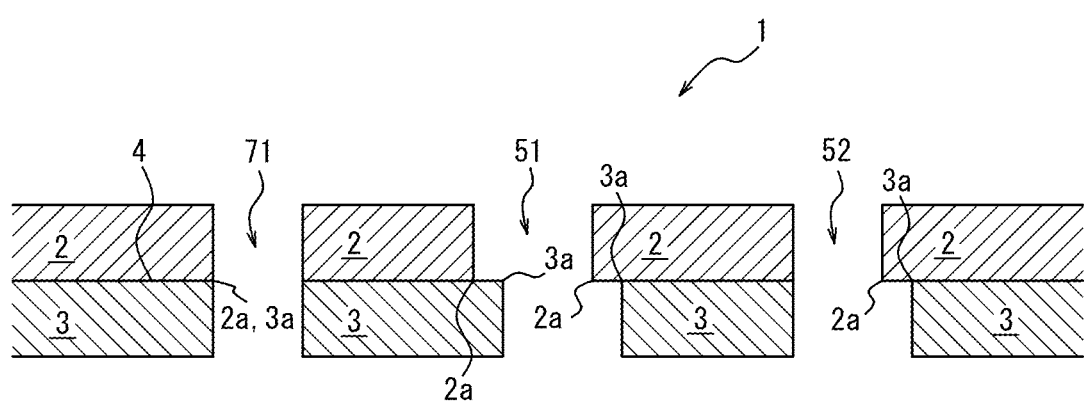
FIG. 1 is a schematic diagram illustrating an example of the cross section in the thickness direction of a stack carbon foam according to the present embodiment.

The following provides a detailed description of an embodiment of the present disclosure (hereinafter, referred to as "present embodiment"). However, the present disclosure is not limited to the following description and may be practiced in various modifications within the essential scope thereof.

A carbon foam of the present disclosure has linear portions (carbon fibers) and node portions joining the linear portions. Specifically, provided are a stack carbon foam being a stack of at least two monolayer carbon foams stacked one another, each monolayer carbon foam comprising linear portions and node portions joining the linear portions, or a carbon foam comprising linear portions and node portions joining the linear portions, wherein the ratio of the number of large through holes having a diameter of 1 mm or more to the surface area of the carbon foam is $0.0003/mm^2$ or less.

[Carbon Foam]

The carbon foam in accordance with the present disclosure is a carbon foam comprising linear portions and node portions joining the linear portions. The carbon foam is preferably formed into a sheet. The carbon foam may be a monolayer carbon foam comprising a single layer of a carbon foam, or a stack carbon foam comprising two or more layers of monolayer carbon foams. An additional layer may be provided on a surface layer or between the layers.

The stack carbon foam may be a stack of carbon foams in the same type or a stack of carbon foams in different types. The stack carbon foam may be a stack of monolayer carbon foams each comprising linear portions and node portions joining the linear portions, a stack of sheet monolayer carbon foams each comprising linear portions and node portions joining the linear portions, or a stack of a sheet monolayer carbon foam or stack carbon foam comprising linear portions and node portions joining the linear portions and a different carbon foam.

The carbon foam of the present embodiment (for example, the modes of [1] to [18] described above and the like) includes: (i) a sheet carbon foam having a ratio of the number of large through holes having a diameter of 1 mm or more to the surface area of the carbon foam is $0.0003/mm^2$ or less (preferably, a sheet carbon foam having a thickness of 0.01 mm or more and 1.0 mm or less, and a ratio of the number of large through holes having a diameter of 1 mm or more to the surface area of the carbon foam of $0.0003/mm^2$ or less) (hereinafter sometimes referred to as "carbon foam I"); (ii) a stack carbon foam (preferably, sheet stack carbon foam) being a stack of a first carbon foam comprising linear portions and node portions joining the linear portions, and a second carbon foam comprising linear portions and node portions joining the linear portions, wherein the stack carbon foam comprises a hole penetrating through the stack carbon foam, at the contact surface of the first carbon foam and the second carbon foam, the outer edge of the hole in the first carbon foam at the contact surface is misaligned with the outer edge of the through hole in the second carbon foam at the contact surface, in the cross section in the thickness direction of the stack carbon foam (hereinafter sometimes referred to as "carbon foam II"); or (iii) a stack carbon foam (preferably, sheet stack carbon foam) being a stack of a first carbon foam comprising linear portions and node portions joining the linear portions, and a second carbon foam comprising linear portions and node portions joining the linear portions, wherein the stack carbon foam comprises a hole not penetrating through the stack carbon foam, the hole extending from one surface of the stack carbon foam to the contact surface of the first carbon foam and the second carbon foam, and terminating at the contact surface, in the cross section in the thickness direction of the stack carbon foam (hereinafter sometimes referred to as "carbon foam III");

As used herein, the term "through hole" refers to a hole extending continuously from one surface to the other surface in the thickness direction of a carbon foam, and a through hole having a diameter of 1 mm or more is referred to as "large through hole". A large through hole refers to a through hole originated from a raw material foam or formed in a carbonization in a manufacturing process, and does not include a through hole that is formed afterward by processing the carbon foam in a cutting die or the like. The "hole" refers to a hole that does not penetrate through the carbon foam, and includes, for example, a depression on the surface, an air bubble in the carbon foam, a terminating hole as described later, and the like.

The thickness of the carbon foam of the present embodiment (for example, the modes of [1] to [18] described above and the like) is preferably 0.01 mm or more, more preferably 0.05 mm or more, and even more preferably 0.1 mm or more, from the viewpoint of ensuring a contact between an electrode and a current collector at the interface therebetween when the carbon foam is used as the electrode. In addition, from the viewpoint of reducing the resistivity when used as an electrode, the thickness is preferably 5.0 mm or less, preferably 3.0 mm or less, preferably 1.0 mm or less, more preferably 0.7 mm or less, more preferably 0.6 mm or less, and even more preferably 0.5 mm or less.

In the carbon foam of the present embodiment (for example, the modes of [1] to [18] described above and the like), the ratio of the number of large through holes having a diameter of 1 mm or more to the surface area of the carbon foam is preferably $0.0003/mm^2$ or less, more preferably $0.0002/mm^2$ or less, and even more preferably $0.0001/mm^2$ or less.

The "ratio of the number of large through hole" refers to the ratio of the number of large through holes that are present on one surface of the carbon foam to the total surface area of that surface. For example, when the carbon foam has a large surface, the number of large through holes having a diameter of 1 mm or more in an area of 100 mm×100 mm of the surface is preferably 3 or less, more preferably 2 or less, and even more preferably 1 or less. The lower limit of the number of large through holes having a diameter of 1 mm or more in an area of 100 mm×100 mm area is not particularly limited, but may be 0 or 1 or more.

The carbon foam of the present embodiment (for example, the modes of [1] to [18] described above and the like) has preferably a region of 60 mm×60 mm or greater (preferably, a region of 60 mm×60 mm), more preferably a region of 80 mm×80 mm or greater (preferably, a region of 80 mm×80 mm), more preferably a region of 100 mm×100 mm or greater (preferably, a region of 100 mm×100 mm), and more preferably a region of 200 mm×200 mm or greater (preferably, a region of 200 mm×200 mm), in which the ratio of the number of large through holes having a diameter of 1 mm or more to the surface area of the carbon foam is $0.0003/mm^2$ or less. The upper limit is not particularly limited, yet the carbon foam has preferably a region of 1000 mm×1000 mm or smaller (preferably a region of 1000 mm×1000 mm), preferably a region of 800 mm×800 mm or smaller (preferably a region of 800 mm×800 mm), and preferably a region of 500 mm×500 mm or smaller (preferably a region of 500 mm×500 mm), in which the ratio of the number of large through holes having a diameter of 1 mm or more to the surface area of the carbon foam is $0.0003/mm^2$ or less.

When the number of large through holes having a diameter of 1 mm or more is within one of the above-mentioned ranges, the carbon foam becomes resistant to be torn during handling of the carbon foam, which improves the handleability.

The diameters of through holes are evaluated by a visual inspection or an inspection using an inspection device including a light source and a photodetector (for example, a pinhole inspection machine). Specifically, a light source is arranged on the surface S side of the carbon foam, and a photodetector is arranged on a surface side opposite to the surface. Then, light is irradiated from the light source toward the surface S of the carbon foam. In the case where the carbon foam includes a through hole, the irradiated light passes through the through hole and reaches the photodetector. The through hole can be detected in this way. The arrangement of the light source and the photodetector may be reversed.

The diameter of a through hole can be measured under a microscope or an electron microscope. Here, as used herein, the "diameter" of a shape formed by light reaching the photodetector refers to the length of the line segment having the maximum length, among line segments connecting two points on the outer circumference of the shape (the line segments may extend outside the shape). For example, the diameter is represented by the diagonal line in case of a rectangle, or the major axis in case of an ellipse.

In the carbon foam of the present embodiment (for example, the modes of [1] to [18] described above and the like), the areas of large through holes are preferably 10 mm$^2$ or more, and more preferably 4 mm$^2$ or more. The areas of the large through holes can be measured by using a device, such as an inspection device and a microscope, in the same manner as the evaluations of the diameters described above.

The shapes of through holes (for example, the shape of through holes on the surface of the carbon foam, and the shape formed by light reaching a photodetector) are not limited, and through holes having cracks and linear through holes are also considered to be through holes.

The stack carbon foam of the present embodiment (for example, the modes of [1] to [18] described above and the like) preferably has a through hole (sometimes simply referred to as a "misaligned through hole") penetrating through the stack carbon foam, at the contact surface in which two adjacent carbon foams contact to each other, an outer edge of the through hole in one carbon foam at the contact surface is misaligned with an outer edge of the through hole in another carbon foam at the contact surface, in the cross section in the thickness direction of the stack carbon foam. The presence of misaligned through holes makes the carbon foam to be less likely to be torn from through holes.

Referring to FIG. 1, through holes will be described in detail. FIG. 1 illustrates a cross section in the thickness direction of a stack carbon foam 1 composed of two layers of carbon foams, wherein the contact surface 4 between one carbon foam 2 and another carbon foam 3, a through hole 71 penetrating through the stack carbon foam, and misaligned through holes 51 and 52 are depicted. The through hole 71 is a non-misaligned through hole in which the outer edges 2a of the through hole 71 in the one carbon foam 2 abut the corresponding outer edges 3a of the through hole 71 in the other carbon foam 3, such that they are continuous, at the contact surface 4. In the misaligned through hole 51, the both outer edges 2a of the through hole in the one carbon foam 2 are misaligned with the corresponding outer edges 3a of the through hole in the other carbon foam 3 at the contact surface 4, at the both edges. In the misaligned through hole 52, one outer edge 2a and one outer edge 3a abutting each other so as to be continuous, and the other outer edge 2a and the other outer edge 3a are misaligned with each other.

The "misaligned through hole" refers to a through hole having an outer periphery, at least a part of the outer periphery including the contact surface 4 in the cross section of the stack carbon foam, and examples thereof include a through hole in which the outer edge 2a and the outer edge 3a are misaligned at least at one outer edge (such as the misaligned through holes 51 and 52, for example). Particularly, the misaligned through hole is preferably a through hole in which the outer edges 2a are misaligned with the corresponding outer edges 3a, at the both outer edges.

The misaligned through hole may be present in any cross section of the stack carbon foam of the present embodiment. When the stack carbon foam is a stack of three or more layers, the "misaligned through hole" refers to a through hole which is misaligned at least at one contact surface in the stack carbon foam, and is preferably a through hole misaligned at all of the contact surfaces.

In the stack carbon foam of the present embodiment (for example, the modes of [1] to [18] described above and the like), the ratio of the number of misaligned through holes as described above to the total number of through holes is preferably 5% or more, preferably 30% or more, and more preferably 60% or more. The upper limit is not particularly limited, yet the ratio may be 100% or less, or 95% or less. When the ratio of misaligned through holes is within one of the above-mentioned ranges, the carbon foam becomes even more less likely to be torn. Particularly, it is more preferable that the ratio of the number of misaligned through holes to the total number of large through holes is within one of the above-mentioned ranges.

Note that the "ratio of the number of misaligned through holes" refers to the ratio determined by analyzing any 100 through holes, and refers to the ratio determined by analyzing all through holes in cases where the number of through holes is less than 100.

The stack carbon foam of the present embodiment (for example, the modes of [1] to [18] described above and the like) preferably has a hole not penetrating through the stack carbon foam (sometimes referred to simply as "terminating holes"), in two adjacent carbon foams contacting to each other, the hole extending from a surface of one carbon foam to the contact surface of the one carbon foam and another carbon foam, and terminating at the contact surface, in a cross direction in the thickness direction of the stack carbon foam. The presence of terminating holes increases the ratio of misaligned through holes and makes the carbon foam to be less likely to be torn from through holes.

Figure 2:
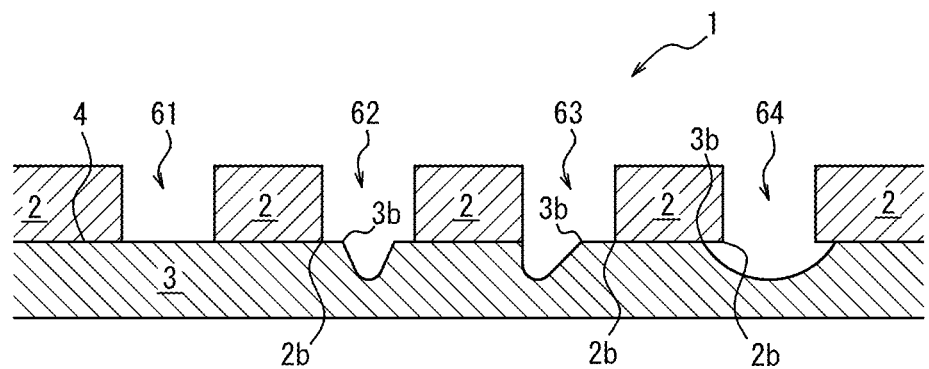
FIG. 2 is a schematic diagram illustrating an example of the cross section in the thickness direction of a stack carbon foam according to the present embodiment.
Figure 3:
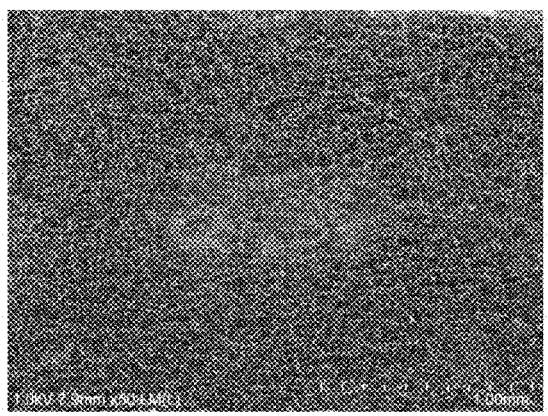
FIG. 3 is an SEM image of terminating holes in a stack carbon foam of the present embodiment.
Figure 4:
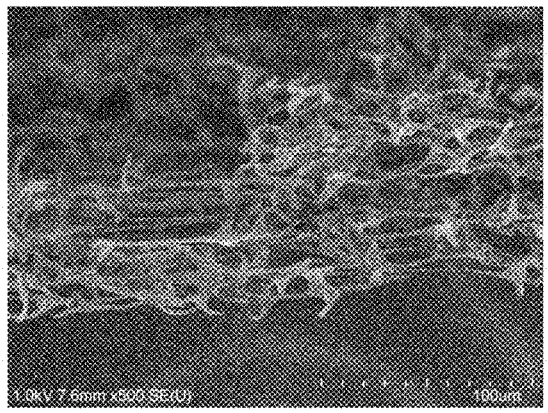
FIG. 4 is an SEM image in the thickness direction of terminating holes in a stack carbon foam of the present embodiment.
Figure 5:
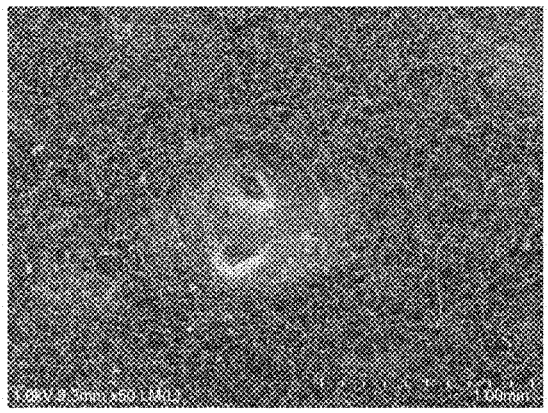
FIG. 5 is an SEM image of a through hole in a carbon foam of the present embodiment.

Referring to FIG. 2, terminating hole will be described in detail. FIG. 2 illustrates a cross section in the thickness direction of a stack carbon foam 1 composed of two layers of carbon foams, in which the contact surface 4 between one carbon foam 2 and another carbon foam 3 and terminating holes 61-64 are depicted. The terminating hole 61 is a hole that extends from the surface of the one carbon foam 2 to the contact surface 4 and terminates at the contact surface 4. The terminating hole 62 extends from the surface of the one carbon foam 2 to the contact surface 4, partly discontinues at the contact surface 4, and partly recesses in the other carbon foam 3, and the outer edges 2b of the hole in the one carbon foam 2 are misaligned with the outer edges 3b of the hole in the other carbon foam 3 at the contact surface 4. The terminating hole 63 is a hole in which one outer edge 2b of one hole abuts one outer edge 3b of the other hole at one outer edge, and the other outer edge 2b of the one hole is misaligned with the other outer edge 3b of the other hole at the other outer edge, at the contact surface 4. The terminating hole 64 is a hole in which a recess in the other carbon foam 3 is greater than a hole extending from the surface of the one carbon foam 2 to the contact surface 4, at the contact surface 4.

The "terminating hole" refers to a hole that does not penetrate through and has an outer periphery, at least a part of the outer periphery including the contact surface 4 in the cross section of the stack carbon foam. The "terminating hole" refers to a hole that terminates at least one contact surface in the stack carbon foam.

<Ratio R of the Number $N_l$ of Linear Portions to the Number $N_n$ of Node Portions>

In the carbon foam of the present embodiment (for example, the modes of [1] to [18] described above and the like), the ratio R of the number $N_l$ of linear portions to the number $N_n$ of node portions is preferably 1.2 or more and 1.7 or less. The ratio R ($N_l/N_n$) is, in other words, the average number of branches branching at a node portion. As in a nonwoven fabric, in a structure where linear portions do not have a three-dimensional network structure in which the linear portions are joined at node portions, and where unjoined linear portions contact to each other, the value of R become smaller. On the other hand, in a porous structure covered with a honeycomb-like wall surface where the linear portions have band shapes, for example, the value of R becomes larger. The ratio R is preferably 1.4 or more and 1.65 or less, more preferably 1.4 or more and 1.6 or less, even more preferably 1.42 or more and 1.60 or less, still more preferably 1.44 or more and 1.58 or less, and particularly preferably 1.45 or more and 1.55 or less.

<Diameter of Linear Portion (Carbon Fiber)>

In the carbon foam of the present embodiment (for example, the modes of [1] to [18] described above and the like), the diameter d of the carbon fiber forming the carbon foam is 0.1 μm or more and 10.0 μm or less. In the present disclosure, the "diameter of the carbon fiber" refers to the diameter of a linear portion connecting node portions. When the diameter of the carbon fiber is 0.1 μm or more, the physical strength and conductivity can be ensured. The diameter of the carbon fiber is more preferably 1.0 μm or more, even more preferably 1.5 μm or more, and particularly preferably 2 or more. When the diameter of the carbon fiber is 10.0 μm or less, the deformability and resilience upon a compression behavior can be assured. The diameter of the carbon fiber is more preferably 5.0 μm or less, even more preferably 4 μm or less, and particularly preferably 3.5 μm or less.

(Method of Measuring Diameter of Linear Portion (Carbon Fiber))

The diameter d of a linear portion (carbon fiber) constituting the carbon foam is determined by an image analysis of a scanning electron microscope (SEM) image. Specifically, the carbon foam is observed at a magnification of 10,000 under a scanning electron microscope. Twenty locations are randomly selected on the obtained observation image, and the thickness of the linear portion (carbon fiber) at each of these locations is measured. Assuming that the cross section is in a circular shape, the average thickness is taken as the diameter d.

<Orientation Angles of Linear Portion>

A carbon foam obtained by heat treating a melamine-formaldehyde foam in a heat treatment furnace for carbonizing it, for example, has an isotropic structure in which carbon fibers constituting the skeleton of the carbon foam extend evenly in all directions. In such a carbon foam, the difference $\theta_c$ between the largest value and the smallest value of θave x, θave y, and θave z is often 1° or less, where, for linear portions included in a region of 300 μm×300 μm×300 μm, the average value of the orientation angles with respect to the x direction is defined as θave x, the average value of the orientation angles with respect to the y direction is defined as θave y, and the average value of the orientation angles with respect to the z direction is defined as θave z.

Of the three directions, the thickness direction of the carbon foam is defined as the x direction, the direction perpendicular to the x direction is defined as the y direction, and the direction perpendicular to the x direction and the y direction is defined as the z direction.

In the carbon foam of the present embodiment (for example, the modes of [1] to [18] described above and the like), the average values of the orientation angles of the linear portions with respect to each of the three mutually orthogonal directions may satisfy a condition where the difference $\theta_c$ between the average value of the orientation angles with respect to one direction and at least one of the average values of the orientation angles with respect to the other directions is 3° or more (i.e., anisotropic). This can suppress a tear of carbon fibers (linear portions) and reduce powdering off even when a compressive load is applied to the carbon foam. The difference $\theta_c$ is preferably 5° or more, more preferably 8° or more, and particularly preferably 10° or more. In addition, from the viewpoint of the flexibility of the carbon foam, the difference $\theta_c$ is preferably 35° or less, more preferably 25° or less, and even more preferably 20° or less. On the contrary, when the difference $\theta_c$ is less than 3°, isotropic orientation increases, and the carbon fibers will be torn and fall, in other words, a considerable amount of powdering off will occur upon application of a compressive load.

The carbon foam of the present embodiment (for example, the modes of [1] to [18] described above and the like) preferably has a region in which a difference $\theta_d$ between the largest value and the second largest value of θave x, θave y, and θave z is preferably 3° or more, where, for linear portions included in a region of 300 μm×300 μm×300 μm in the carbon foam, the average value of the orientation angles with respect to the x direction is defined as θave x, the average value of the orientation angles with respect to the y direction is defined as θave y, and the average value of the orientation angles with respect to the z direction is defined as θave z. The difference $\theta_d$ between the largest value and the second largest value of θave x, θave y, and θave z is more preferably 5° or more, further preferably 8° or more, and particularly preferably 10° or more. The upper limit of the difference between the largest value and the second largest value θave x, θave y, and θave z is not particularly limited, yet it is preferably 35° or less, more preferably 25° or less, and further preferably 20° or less, from the viewpoint of the flexibility of the carbon foam.

In addition, the differences between the largest value of θave x, θave y, and θave z and the remaining two are preferably both 3° or more, more preferably 5° or more, further preferably 8° or more, and particularly preferably 10° or more. The upper limit of the differences between the largest value of θave x, θave y, and θave z and the remaining two is not particularly limited, yet it is preferably 35° or less, more preferably 25° or less, and further preferably 20° or less, from the viewpoint of the flexibility of the carbon foam.

It is acceptable that at least a part of the carbon foam of the present embodiment includes a region of 300 μm (length)×300 μm (width)×300 μm (height) which satisfies the above conditions of θave x, θave y, and θave z.

As used herein, the number $N_n$ of node portions, the number $N_l$ of linear portions, the density of the node portions, and the orientation angles θ refer to values obtained by imaging the carbon foam using an X-ray computerized tomography (CT) apparatus, subjecting the obtained tomogram data to median filter processing as preprocessing, then using the Otsu's binarization algorithm (see Nobuyuki OTSU, "Automatic Threshold Selection Method based on Discrimination and Least Squares Criterion", *The IEICE Transactions D*, Vol. J63-D, No. 4, pp. 346-356 (1980)) to divide the region into the structure and space to obtain a three-dimensional image of the structure including the inside of the carbon foam, and using the obtained three-dimensional image and structural analysis software.

Specifically, the number $N_n$ of node portions and the number $N_l$ of linear portions are determined by detecting the node portions and the linear portions included in the three-dimensional image obtained as described above, and counting the numbers thereof. With the obtained $N_n$ and $N_l$, the ratio R of $N_l$ to $N_n$ can be determined.

Furthermore, the orientation angle θ of a linear portion is an angle between a straight line connecting the node portions at two ends of the linear portion and each direction, and is determined for each of the three mutually orthogonal directions in the three-dimensional image. The average value of orientation angles of linear portions is determined for each direction.

A CT apparatus with low-energy and high-brightness X-rays, such as a high-resolution 3D X-ray microscope nano3DX manufactured by Rigaku Corporation, may be used as the CT apparatus for a structural analysis of a carbon foam. For the image processing and a structural analysis, Centerline Editor of Simpleware software manufactured by JSOL Corporation, for example, may be used.

<Density of Node Portion>

In the carbon foam of the present embodiment (for example, the modes of [1] to [18] described above and the like), the density of the node portions is preferably 15,000/mm³ or more, more preferably 20,000/mm³ or more, and even more preferably 30,000/mm³ or more, from the viewpoint of the resilience upon being subjected to a compressive load. In addition, the density of the node portions is preferably 5,000,000/mm³ or less, more preferably 3,000,000/mm³ or less, and even more preferably 2,000,000/mm³ or less, from the viewpoint of the flexibility of the carbon foam.

It is preferable that at least a part of the carbon foam of the present embodiment have a location satisfying one of the above ranges of the density of the node portions. It is more preferable that 50% by volume of the carbon foam satisfy one of the above density ranges, still more preferable that 75% by volume of the carbon foam satisfy one of the above density ranges, and particularly preferable that any location in the carbon foam satisfy one of the above density ranges.

<Carbon Content>

The carbon content of the carbon foam of the present embodiment (for example, the modes of [1] to [18] described above and the like) is preferably 51% by mass or more, more preferably 60% by mass or more, even more preferably 65% by mass or more, even more preferably 70% by mass or more, even more preferably 75% by mass or more, even more preferably 80% by mass or more, even more preferably 85% by mass or more, and particularly preferably 90% by mass or more, from the viewpoint of conductivity. The upper limit is not particularly limited, yet the carbon content may be 100% by mass or less, 99% by mass or less, or 98% by mass or less.

It is to be noted that the carbon content of the carbon foam is the ratio of the mass of carbon atoms to the mass of all atoms constituting the carbon foam, and can be determined by X-ray fluorescence measurement.

<Ratio of Oxygen Atoms>

The ratio of oxygen atoms (oxygen content) of the carbon foam of the present embodiment (for example, the modes of [1] to [18] described above and the like), which is measured by a surface analysis by X-ray fluorescence spectroscopy, is preferably 0.03% by mass or more, more preferably 0.05% by mass or more, and even more preferably 0.07% by mass or more, from the viewpoint of wettability to an electrolyte solution. In addition, the ratio is preferably 10% by mass or less, more preferably 5% by mass or less, and even more preferably 3% by mass or less from the viewpoint of the resistance of an electrode. The oxygen content of the carbon foam is the ratio of the mass of oxygen atoms to the mass of all atoms constituting the carbon foam, and can be determined by X-ray fluorescence measurement. The ratio of oxygen atoms can be increased by increasing the temperature at an oxidation step carried out after carbonization, for example.

It is to be noted that the total mass of carbon atoms and oxygen atoms may be 60% by mass or more and 99.9% by mass or less.

<Crystallite Size>

The crystallite size Lc of the carbon foam of the present embodiment (for example, the modes of [1] to [18] described above and the like) is preferably 1.1 nm or more, and more preferably 1.5 nm or more from the viewpoint of conductivity. In addition, Lc is preferably 4.0 nm or less and more preferably 3.0 nm or less, from the viewpoint of physical fragility.

It is to be noted that Lc can be determined from the diffraction of the (002) plane of the carbon foam obtained by wide angle X-ray diffraction.

Specifically, a sample is ground in a mortar. Subsequently, the ground sample is subjected to a wide-angle X-ray measurement using a desktop X-ray diffractometer D2 PHASER (manufactured by Bruker Corporation) under conditions, such as the following specific conditions.

[Measurement Condition]
Radiation source: Cu Kα
Tube current: 30 mA
Tube voltage: 40 kV
Slit: 1 mm
Sample rotational speed: 10 rotations/minute
Measurement time of one step: 0.3 seconds
Start angle (2θ): 5.00°
Measurement step (2θ): 0.01°
End angle (2θ): 90.00°

After a measurement, the obtained data is analyzed to calculate the crystallite size Lc. The crystallite size Lc can be determined by substituting the half-value width β of the diffraction peak of the (002) plane appearing near 2θ=25 degrees and the angle θ of the peak maximum value into the following Scherrer equation (14). In general, a higher carbonization temperature leads to higher crystallinity and a larger Lc value.

$$Lc = (K\lambda)/\beta \cos \qquad (14)$$

where K represents the shape factor, and λ represents the wavelength of the radiation source. Since the (002) plane diffraction is used, 0.90 is substituted for the shape factor.

Since CuKα is used as the radiation source in this case, 1.541 is substituted for the wavelength in a calculation.

<Porosity>

The porosity of the carbon foam of the present embodiment (for example, the modes of [1] to [18] described above and the like) is preferably 50% or more, more preferably 60% or more, even more preferably 70% or more, particularly preferably 80% or more, particularly preferably 90% or more, and particularly preferably 95% or more, from the viewpoint of flexibility. As used herein, the "porosity" refers to a value determined from a bulk density and a real density. A bulk density is a density based on the volume including pores in the carbon foam. On the other hand, a real density is a density based on the volume occupied by the material of the carbon foam.

(Measurement of Bulk Density)

First, the dimensions of the carbon foam are measured using vernier calipers or the like, and the obtained dimensions are used to determine the bulk volume $V_{bulk}$ of the carbon foam. Next, the mass M of the carbon foam is measured using a precision balance. From the obtained mass M and bulk volume $V_{bulk}$, the bulk density $\rho_{bulk}$ of the carbon foam can be determined using the following equation (1):

$$\rho_{bulk} = M/V_{bulk} \qquad (1)$$

The bulk density is preferably 3.0 kgm$^{-3}$ or more, more preferably 3.5 kgm$^{-3}$ or more, and even more preferably 4.0 kgm$^{-3}$ or more, from the viewpoint of reducing the resistance as an electrode. In addition, the bulk density is preferably 400 kgm$^{-3}$ or less, more preferably 300 kgm$^{-3}$ or less, and even more preferably 200 kgm$^{-3}$ or less, from the viewpoint of the flexibility of the carbon foam.

(Measurement of Real Density)

The real density $\rho_{real}$ of the carbon foam can be determined with the sink-float method using a mixed solution of n-heptane, carbon tetrachloride, and ethylene dibromide. Specifically, a carbon foam in an appropriate size is placed into a stoppered test tube first. Next, three solvents are appropriately mixed and added to the test tube, and the test tube is soaked in a thermostat bath at 30° C. If the specimen comes up, n-heptane with a lower density is added. On the other hand, if the specimen sinks down, then ethylene dibromide having a higher density is added. This operation is repeated until the specimen drifts in the liquid. Finally, the density of the liquid is measured using a Gay-Lussac pycnometer.

(Calculation of Porosity)

From the bulk density $\rho_{bulk}$ and the real density $\rho_{real}$ determined as described above, the porosity $V_{f,pore}$ can be determined using the following equation (2):

$$V_{f,pore} = ((1/\rho_{bulk}) - (1/\rho_{real}))/(1/\rho_{bulk}) \times 100 (\%) \qquad (2)$$

The carbon foam of the present embodiment can be suitably used as an electrode, a filter, a cushioning material, and the like, for example. An electrode is preferably used for applications of a fuel cell, a redox flow battery, and an electrolysis, and is particularly suitable to a redox flow battery. An electrode for a redox flow battery of the present embodiment preferably includes the stack carbon foam or carbon foam described above.

The carbon foam II and the carbon foam III have fewer through holes, and thus have a higher conductivity when used as an electrode for a cell, for example, as compared to an electrode composed of carbon foams having a small surface area arranged side by side. When used as filters, they are capable of catching materials to be collected without allowing the materials to escape.

In addition, the carbon foam I has fewer large through holes and is thin, and thus has a high conductivity and can further reduce the resistivity when used as an electrode. When used as a filter, the thickness can be reduced, as well as providing an excellent collecting capability and achieving weight reduction.

[Method of Manufacturing Carbon Foam]

A method of manufacturing a carbon foam includes a method including a step of carbonizing a resin foam serving as a raw material of the carbon foam (carbonization step).

For example, examples of the method of manufacturing a monolayer carbon foam include a process including a step of pressing a thick raw material resin foam at a high pressing ratio (pressing step) and a step of forming a carbon foam (carbonization step), and a carbonization step while applying a high compressive load.

Examples of the method of manufacturing a stack carbon foam include a method comprising a carbonization step and a step of staking and pressing resin foams or carbon foams (pressing step), and a process comprising a step of carbonizing resin foams or carbon foams while applying a large load. Specifically, examples include (1) a method comprising a step of stacking and pressing at least two layers of resin foams to form a stack resin foam (resin foam pressing step), and a step of carbonizing the stack resin foam to manufacture a stack carbon foam (preferably, a sheet stack carbon foam) (carbonization step); (2) a method comprising a step of stacking at least two layers of carbon foams to form a stack (carbon foam stack step), and a step of pressing the stack to manufacture a stack carbon foam (preferably, a sheet stack carbon foam) (carbon foam pressing step); (3) a method comprising a step of stacking at least one layer of resin foam and at least one layer of carbon foam to form a stack, and a step of carbonizing the stack to manufacture a stack carbon foam (preferably, a sheet stack carbon foam) (carbonization step); (4) a method comprising a step of stacking at least two layers of resin foams and carbonizing them while applying a large load; and (5) a method comprising a step of stacking at least one layer of resin foam and at least one layer of carbon foam and carbonizing them while applying a large load.

The methods of manufacturing the carbon foam I, the carbon foam II, and the carbon foam III include the above-mentioned methods, for example, of which the methods (1) and (2) are preferable, and the method (1) is more preferable.

From the viewpoint that carbon becomes continuous in the thickness direction, thereby achieving a reduction in the resistivity, a preferred carbon foam is an integrated stack. In the manufacturing method of such a carbon foam, it is preferable that resins to be fused are present upon carbonization (resins are mixed before pressing or applying a load). Examples of such a method includes the methods (1), (3), (4) and (5) described above, or a method comprising coating at least a part of a carbon foam with a resin before stacking carbon foams, followed by carbonization, for example.

The manufacturing method of (1) is preferably a method comprising stacking and pressing a first resin foam and a second resin foam to form a stack resin foam; and carbonizing the stack resin foam to manufacture a stack carbon foam (preferably, a sheet stack carbon foam) being a stack of the first carbon foam comprising linear portions and node portions joining the linear portions, and the second carbon foam comprising linear portions and node portions joining the linear portions.

Further, the manufacturing method of (2) is preferably stacking a first carbon foam comprising linear portions and node portions joining the linear portions, and a second carbon foam comprising linear portions and node portions joining the linear portions, to form a stack; and pressing the stack to manufacture a stack carbon foam (preferably a sheet stack carbon foam).

The stack carbon foam obtained by the manufacturing method (1) or (2) is preferably one of the above-mentioned carbon foams, and more preferably the carbon foam I, the carbon foam II, or the carbon foam III.

<Resin Foam>

Examples of the resin foam described above include any of resin foams known as raw materials of carbon foams, such as a melamine resin foam; a urethane resin foam; a phenol resin foam; an acrylonitrile resin foam; and the like. Of these, a melamine resin foam is preferable from the viewpoint of uniformities of the sizes and diameters of linear portions.

A melamine resin foam as described above can be produced by carrying out a foaming treatment on an aqueous solution or dispersion containing a melamine/formaldehyde precondensate, an emulsifier, a foaming agent, a curing agent, and, if necessary, a well-known filler, followed by a curing treatment. In the foaming treatment and the curing treatment, a solution containing the above-mentioned components may be heated to a temperature which is set in accordance with the type or the like of foaming agent used (e.g., a temperature equal to or higher than the boiling point of the foaming agent).

Examples of the melamines include melamine, guanamine, N-butyl melamine, N-phenyl melamine, N,N-diphenyl melamine, N,N-diallyl melamine, N,N',N''-triphenyl melamine, N,N',N''-trimethylol melamine, benzoguanamine, 2,4-diamino-6-methyl-1,3,5-triazine, 2,4-diamino-6-butyl-1,3,5-triazine, 2,4-diamino-6-benzyloxy-1,3,5-triazine, 2,4-diamino-6-butoxy-1,3,5-triazine, 2,4-diamino-6-cyclohexyl-1,3,5-triazine, 2,4-diamino-6-chloro-1,3,5-triazine, 2,4-diamino-6-mercapto-1,3,5-triazine, and amelin (N,N,N',N'-tetracyanoethyl benzoguanamine). The above-described melamines may be used alone or in a combination of two or more.

The precondensate may include monomers other than melamines and formaldehyde.

The melamine/formaldehyde precondensate may be one having a ratio of melamine:formaldehyde=1:1.5 to 1:4, and an average molecular weight of 200 to 1000, for example.

The conditions for the condensation include a pH of 7 to 10 and a temperature of 70 to 100° C., for example.

Examples of the emulsifier include sodium salts of an alkyl sulfonic acid and an arylsulfonic acid. The emulsifier can be used in a ratio of 0.5 to 5% by mass with respect to 100% by mass of the precondensate.

Examples of the foaming agent include pentane, hexane, trichloro fluoromethane, trichloro trifluoroethane, and hydroxyfluoroether. The foaming agent can be used in a ratio of 1 to 50% by mass with respect to 100% by mass of the precondensate.

Examples of the curing agent include hydrochloric acid, sulfuric acid, and formic acid. The curing agent can be used in a ratio of 0.01 to 20% by mass with respect to 100% by mass of the precondensate.

As a melamine resin foam as described above, a melamine-formaldehyde foam produced with the method described in JP H04-349178 A can be used, for example.

A urethane resin foam, a phenol resin foam, and an acrylonitrile resin foam as described above can be suitably manufactured by any of well known methods.

The bulk density of the resin foam is preferably 0.001 to 0.1 $g/mm^3$ and more preferably 0.005 to 0.02 $g/mm^3$.

The porosity of the resin foam is preferably 60 to 99.9% and more preferably 80 to 99%.

<Carbonization Step>

Examples of the carbonization step include a process comprising subjecting a resin foam to a heat treatment in an inert gas flow, such as nitrogen flow, or in an inert gas atmosphere, such as vacuum, for carbonization while applying a compressive load to the resin foam; and a process comprising a raw material foam introduction step where a resin foam is introduced into a heat treatment furnace, a heating step where a temperature inside the heat treatment furnace is raised to a heat treatment temperature at a first temperature elevation rate, a carbonization step where the resin foam is retained at the heat treatment temperature for predetermined time to be carbonized to obtain a carbon foam, a cooling step where the temperature inside the heat treatment furnace is lowered to room temperature, and a carbon foam removing step where the carbon foam is removed from the heat treatment furnace. Here, an example of the heating step includes a step of increasing the temperature while decompressing and evacuating the inside of a heat treatment furnace, at least in a first temperature range where a large amount of a decomposition gas is generated from the resin foam.

In the raw material foam introduction step, the heat treatment furnace for carbonizing the raw material resin foam is not limited as long as it is a furnace capable of carbonizing the resin foam to obtain a carbon foam. Examples thereof include a heat treatment furnace including a reaction furnace for receiving a raw material resin foam, a heater for heating the inside of the reaction furnace, a gas introduction port for introducing an inert gas into the reaction furnace, a gas discharge port for discharging gas from the reaction furnace, and a vacuum pump for decompressing the inside of the reaction furnace to create a vacuum.

In the heating step, it is preferable to raise the temperature while decompressing and evacuating the inside of the heat treatment furnace in a first temperature range where a large amount of a decomposition gas is generated from the resin foam.

As described above, when the raw material resin foam of the carbon foam is heated, the active decomposition gas generated from the resin foam reacts with the carbon fibers constituting a carbon foam and decomposes, resulting in formation of defects (e.g., large through holes) in the carbon foam. The amount of the decomposition gas generated depends on the temperature inside the furnace. Formation of defects in the carbon foam in the heating step is prevented by decompressing and evacuating the inside of a heat treatment furnace in a temperature range (first temperature range) where a large amount of a decomposition gas is generated from the resin foam, to promote the diffusion of decomposition gas generated inside the resin foam to the outside of the foam structure.

The "temperature range (first temperature range) where a large amount of a decomposition gas is generated from the resin foam" refers to a range determined as follows. The weight of the raw material resin foam in the heating step is monitored in advance from 0° C. at intervals of 100° C. The first temperature range is defined to a temperature range where the weight of the resin foam decreases by 5% or more of the initial weight per 100° C. For example, in the case where the weight of the resin foam decreases by 5% or more of the initial weight per 100° C. in all temperature ranges of 300° C. or higher and lower than 400° C., 400° C. or higher and lower than 500° C., and 500° C. or higher and lower than 600° C., the first temperature range is 300° C. or higher and lower than 600° C.

In the case where a melamine resin foam is used as the resin foam, the temperature range with a large amount of decomposition gas (first temperature range) is a temperature range of 200° C. or higher and lower than 800° C.

The decompression and evacuation can be carried out by an evacuation means, such as a vacuum pump. The evacuation is preferably carried out by a pump having at least an evacuation ability capable of reducing the pressure inside the furnace to 1 Pa or less within 10 minutes.

In the case where a melamine resin foam is used as the raw material resin foam, for example, the temperature elevation rate up to the heat treatment temperature (first temperature elevation rate) is preferably 10° C./min or lower from the viewpoint of suppressing the amount of the decomposition gas generated. In addition, the first temperature elevation rate is preferably 1° C./min or higher from the viewpoint of overall productivity.

In the temperature range where a large amount of a decomposition gas is generated from the resin foam (first temperature range), the heating step is preferably carried out at a temperature elevation rate (second temperature elevation rate) lower than the temperature elevation rate up to the heat treatment temperature (first temperature elevation rate). This can reduce the amount of the decomposition gas generated inside the resin foam per unit time, and further promote the diffusion of the decomposition gas to the outside of the foam structure. In the case where the temperature elevation rate is reduced (in other words, the temperature elevation rate is changed to the second temperature elevation rate) in the first temperature range, the temperature elevation rate may be set again to the first temperature elevation rate once the temperature inside the furnace exceeds the upper limit of the first temperature range.

Furthermore, in the range where the rate of an increase in the amount of the decomposition gas generated is high (second temperature range) within the first temperature range where a large amount of the decomposition gas is generated, the heating step is preferably carried out at a temperature elevation rate (third temperature elevation rate) lower than the second temperature elevation rate. This can further reduce the amount of the decomposition gas generated inside the resin foam per unit time, and further promote the diffusion of the decomposition gas to the outside of the foam structure.

The "temperature range where the rate of an increase in the amount of the decomposition gas generated from the resin foam is high (second temperature range)" refers to a range determined as follows. The weight of the raw material resin foam in the heating step is monitored in advance from 0° C. at intervals of 100° C. The first temperature range is defined to a temperature range where the weight of the resin foam decreases by 20% or more of the initial weight per 100° C. For example, in the case where the weight of the resin foam decreases by 20% or more of the initial weight per 100° C. in both temperature ranges of 300° C. or higher and lower than 400° C. and 400° C. or higher and lower than 500° C., the second temperature range is 300° C. or higher and lower than 500° C.

In the case where a melamine resin foam is used as the raw material resin foam, the temperature range where the rate of an increase in the amount of decomposition gas generated from the resin foam is high (second temperature range) is a temperature range of 300° C. or higher and lower than 400° C. In the case where a melamine resin foam is used as the resin foam, it is more preferable that the temperature elevation rate is 5° C./min or lower in the first temperature range, and particularly preferable that the heating temperature is 3° C./min or lower in the second temperature range.

Moreover, in the heating step and the carbonization step described later, the atmosphere inside the furnace is preferably made into an inert gas atmosphere or a vacuum to prevent the decomposition reaction between oxygen and the carbon fibers constituting a carbon foam. The furnace under a "vacuum" herein indicates that the degree of vacuum inside the furnace is less than 1 Pa. In the case where an inert gas atmosphere is used, after introducing the resin foam, serving as a raw material of the carbon foam, into the heat treatment furnace (raw material foam introduction step), the inside of the furnace is preferably decompressed and evacuated to discharge the air containing oxygen. Nitrogen gas is preferably introduced after the inside of the furnace reaches a degree of vacuum of less than 1 Pa and is sufficiently evacuated. In this way, the inside of the furnace can be made into a nitrogen gas atmosphere. When the inside of the furnace is made into an inert gas atmosphere or a vacuum as described above, the heating starts, and the inside of the furnace is decompressed and evacuated in the first temperature range.

Furthermore, in the range of 200° C. or higher and lower than 800° C. where a large amount of the decomposition gas is generated from the melamine resin foam (first temperature range), the decompression and evacuation is preferably continued while introducing the inert gas into the furnace. The inert gas, such as nitrogen gas or argon gas, are made to flow inside the furnace, thereby promoting the discharge of the decomposition gas generated inside the resin foam.

During the introduction of the inert gas, the flow rate of the inert gas is preferably 1 L/min or more, more preferably 3 L/min or more, and particularly preferably 5 L/min or more. In addition, the flow rate of the inert gas is preferably 40 L/min or less, more preferably 30 L/min or less, and particularly preferably 20 L/min or less.

Subsequently, in the carbonization step, the resin foam is retained at the heat treatment temperature, which has been reached by raising the temperature, for predetermined time to be carbonized to obtain a carbon foam. The heat treatment temperature is preferably higher than the softening point of the raw material resin foam. For example, when a melamine resin foam is used as the resin foam, since the softening point of the melamine resin foam is 300° C. to 400° C., the heat treatment temperature is a temperature equal to or higher than the softening point. The heat treatment temperature is preferably 800° C. or higher and more preferably 1000° C. or higher. In addition, from the viewpoint of physical fragility caused by high crystallinity, the heat treatment temperature is preferably 3000° C. or lower and more preferably 2500° C. or lower.

The time for retaining the resin foam at the heat treatment temperature (heat treatment time) is preferably time duration during which the raw material resin foam can be completely carbonized. For example, in the case where a melamine resin foam is used as the raw material resin foam, the retention time is preferably 0.5 hours or longer, more preferably 1 hour or longer, and even more preferably 2 hours or longer.

In addition, from the viewpoint of the productivity, the retention time is preferably 5 hours or shorter, and more preferably 4 hours or shorter.

In the cooling step, from the viewpoint of mitigating the damage to the heaters and the insulation material in the furnace caused by rapid cooling, the cooling rate from the carbonization temperature of the melamine resin foam is preferably 20° C./min or lower. The cooling rate is more preferably 15° C./min or lower. In addition, from the viewpoint of overall productivity, the cooling rate is preferably 5° C./min or higher. The cooling rate is more preferably 10° C./min or higher.

By carrying out the above-described controls, a carbon foam having a large surface area can be manufactured.

Moreover, the heating step and the carbonization step can be performed while applying a compressive load to the raw material resin foam, so that a carbon foam having a skeleton structure in which carbon fibers extend anisotropically can be obtained. An anisotropic carbon foam is capable of suppressing tears of carbon fibers, reducing powdering off, and realizing high resilience even when a compressive load is applied.

The compressive load can be applied by placing a weight, such as a graphite plate, on the raw material resin foam. The applied compressive load is preferably 50 Pa or more and more preferably 200 Pa or more. In addition, the compressive load is preferably 2000 Pa or less and more preferably 1500 Pa or less.

When a compressive load is applied to the raw material resin foam, the diffusion of the decomposition gas is suppressed by the weight, such as the graphite plate. Therefore, during the heating step, it is particularly preferable to reduce the temperature elevation rate as compared with the case where no compressive load is applied, and to continue the decompression and evacuation while introducing the inert gas into the furnace to promote the discharge of the decomposition gas.

For example, in the case where a melamine resin foam is used as the raw material resin foam, it is preferable that the temperature elevation rate is 5° C./min or lower in the temperature range of 200° C. or higher and lower than 800° C. (first temperature range), and more preferable that the temperature elevation rate is 2° C./min or lower in the temperature range of 300° C. or higher and lower than 400° C. where the rate of an increase in the amount of the decomposition gas generated is high (second temperature range). Furthermore, it is preferable to supply an inert gas, such as nitrogen gas or argon gas, into the heat treatment furnace in the temperature range of 200° C. or higher and lower than 800° C. (first temperature range).

The compressive stress on the raw material resin foam may be applied not only in one direction but also in two directions.

<Pressing Step>

A stack carbon foam can be manufactured by separately carrying out the pressing step of compressing a stack of resin foams, carbon foams, or a resin foam and a carbon foam, and the carbonization step. A monolayer carbon foam may also be carbonized after being subjected to a pressing step described below.

An apparatus for carrying out the pressing step is not limited as long as it is capable of discharging active gases and heating and pressing a resin foam, or capable of compressing a stack of carbon foams. Examples thereof include a heat treatment furnace including a top plate for pressing a resin foam, a heater for heating the top plate, a gas discharge port for discharging gas from the furnace, and a vacuum pump for decompressing the inside of the furnace and making it under a vacuum. In the pressing step, the same apparatus as that used for stacking resin foams may be used.

Examples of a carbon foam used in the pressing step include a foam obtained by carbonizing a melamine resin, and is preferably a foam that is anisotropic in the plane direction from the viewpoint of powdering off.

In the resin foam pressing step, upon stacking resin foams, one resin foam may be sliced into a plurality of sheets, which are stacked one another, or different resin foams may be stacked, for example.

In cases where stacking sliced resin foams, the sliced resin foams are preferably stacked by rotating them by an angle of more than 0° and less than 360°, by flipping some of sliced resin foams, by stacking them in the order different from the order when they were sliced, by staking sliced resin foams obtained from resin foams in different lots of the same specification, and by displacing the positions from each other, from the viewpoint of reducing the number of through holes by displacing the positions of through holes in resin foams to be stacked. If sliced resin foams are stacked as they are sliced, the positions of the through holes in the sliced resin foams remain the same and the number of through holes is not reduced. Hence, the sliced resin foams are preferably not stacked as they are sliced.

Different resin foams described above may be porous bodies having a contiguous pore structure, and examples include resin foams made from different materials, resin foams made from the same material but have different pore structures, and resin foams cut out from resin foams in different lots of the same specification.

In the pressing step, the number of resin foams or carbon foams stacked may be 2 or more from the viewpoint of reducing through holes, and preferably 40 or less, more preferably 20 or less, and even more preferably 10 or less, from the viewpoint of ease of handling upon stacking before pressing.

The thickness of a spacer used in the pressing step is preferably 0.05 to 5 mm, more preferably 0.1 to 1 mm, and even more preferably 0.2 to 0.5 mm, since the thickness becomes smaller in the vicinity of the center as compared to the outer periphery in the vicinity of the spacer due to a pressure applied from the center of the top plate.

The thickness of the spacer used for stacking and compressing carbon foams is preferably 0.05 mm to 1 mm and more preferably 0.1 mm to 0.3 mm.

The ratio of the thickness of the spacer to the thickness of a stack of resin or carbon foams is preferably 1 to 50% and more preferably 2 to 10%, from the viewpoint of obtaining a foam having a moderate porosity.

From the viewpoint of discharging the decomposition gas generated, the pressing step is preferably performed while decompressing and evacuating. The condition for the decompression and evacuation is a pressure of preferably 30 Pa or less and more preferably 10 Pa or less. In the pressing step, the decompression and evacuation may be continued from the start of the temperature rise to the end of the cooling, or may be carried out only in a temperature range of 150° C. or higher in which resin foams hardly react with oxygen in the air.

The condition to raise the temperature in the pressing step is preferably 1 to 20° C./min from the viewpoint of reducing the amount of the decomposition gas generated per unit time, and more preferably 3 to 10° C./min from the viewpoint of the productivity.

The pressing temperature in the pressing step is preferably from 250 to 400° C., more preferably from 320 to 380° C., from the viewpoint of the softening temperature of the resin foam and separation from the substrate.

Upon stacking and compressing carbon foams, the pressing temperature is preferably 100° C. or higher and 250° C. or lower, and more preferably 120° C. or higher and 180° C. or lower, from the viewpoint of preventing oxidation of the surfaces.

In addition, the pressing time in the pressing step is preferably from 5 to 120 minutes and more preferably from 20 to 60 minutes, from the viewpoint of maintaining the foam structure and separation from the substrate.

The pressing pressure in the pressing step is preferably 0.1 to 10 MPa, more preferably 0.5 to 3 MPa, from the viewpoint of a deformation caused by a pressure applied to the center part of the top plate.

The cooling condition in the pressing step is preferably 1 to 30° C./min from the viewpoint of protecting the press machine, and more preferably 5 to 20° C./min from the viewpoint of the productivity.

Upon carbonizing a stack resin foam that has undergone the pressing step, it is desirable to apply a compressive load by placing a graphite plate or the like, from the viewpoint of reducing a deformation. In this case, the compressive load applied is preferably 10 Pa or more, and more preferably 70 Pa or more. In addition, the compressive load is preferably 700 Pa or less, and more preferably 400 Pa or less.

Further, in the case where the pressing step has been carried out, the amount of the decomposition gas generated in the first temperature region in the carbonization step is reduced. Thus, the temperature may be raised at a higher rate in the first temperature region. From the viewpoint of productivity, the temperature elevation rate is preferably from 2 to 50° C./min and more preferably from 5 to 20° C./min.

The carbon foam of the present embodiment may be further subjected to an additional oxidation treatment, and the oxidization is carried out during the carbonization step or after completion of the carbonization step, for example. The oxidation treatment may be achieved through heating in the presence of oxygen or a chemical oxidization, or the like.

EXAMPLES

The following provides a description of specific examples and comparative examples. However, the present disclosure is not limited to the following examples.

<Structural Analysis by X-Ray CT>

Figure 6:
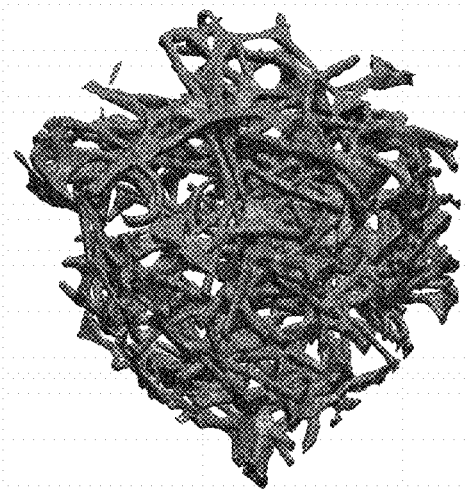
FIG. 6 is an X-ray CT analysis image obtained from a carbon foam of Example 1.
Figure 7:
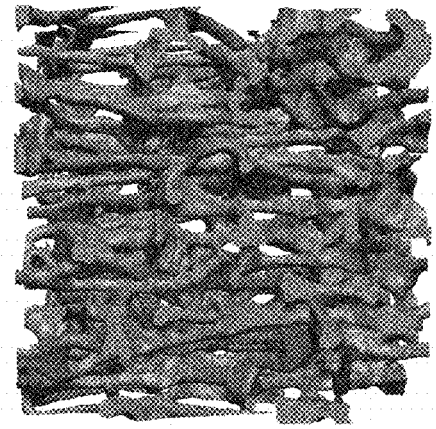
FIG. 7 is an image obtained by changing the angle of the image in FIG. 6.
Figure 8:
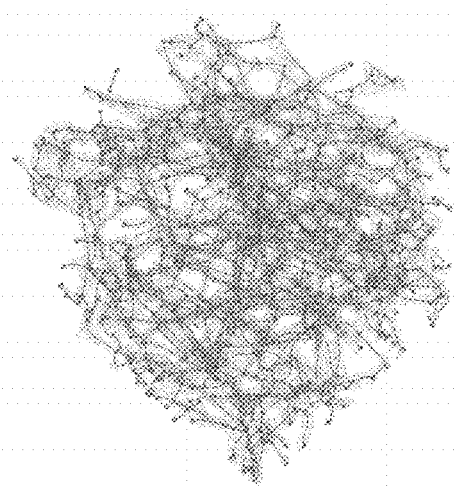
FIG. 8 is an image obtained by subjecting the image of FIG. 6 to image processing for line and node detection.

The carbon foams of Examples 1 to 6 and Comparative Examples 1 and 2 were subjected to structural analyses by X-ray CT. Specifically, in order to facilitate X-ray imaging, electroless copper plating was first performed on each of the carbon foams of the Examples and Comparative Examples. Subsequently, a specimen was collected from each carbon foam, and structural analyses were performed on the collected specimens using a high-resolution 3D X-ray microscope nano3DX (manufactured by Rigaku Corporation). As an example of the results, FIGS. 6 and 7 are X-ray CT analysis images obtained with the carbon foam of Example 1, and FIG. 8 is an image obtained by subjecting the image of FIG. 6 to image processing for line and node detection.

The following describes the electroless plating conditions and the X-ray CT analysis conditions in detail.

[Electroless Plating Condition]

The sample was immersed in OPC Condiclean MA (manufactured by Okuno Chemical Industries Co., Ltd., diluted to 100 mL/L with distilled water) at 70° C. for 5 minutes, and then washed with distilled water for 1 minute. Subsequently, the sample was immersed in OPC Predip 49L (manufactured by Okuno Chemical Industries Co., Ltd., diluted to 10 mL/L with distilled water and added with 98% sulfuric acid at 1.5 mL/L) at 70° C. for 2 minutes, and then washed with distilled water for 1 minute. Subsequently, the sample was immersed in a solution, which was obtained by mixing OPC Inducer 50 AM (manufactured by Okuno Chemical Industries Co., Ltd., diluted to 100 mL/L with distilled water) and OPC Inducer 50 CM (manufactured by Okuno Chemical Industries Co., Ltd., diluted to 100 mL/L with distilled water) at 1:1, at 45° C. for 5 minutes, and then washed with distilled water for 1 minute. Subsequently, the sample was immersed in OPC-150 Crystal MU (manufactured by Okuno Chemical Industries Co., Ltd., diluted to 150 mL/L with distilled water) at room temperature for 5 minutes, and then washed with distilled water for 1 minute. Subsequently, the sample was immersed in OPC-BSM (manufactured by Okuno Chemical Industries Co., Ltd., diluted to 125 mL/L with distilled water) at room temperature for 5 minutes. Subsequently, the sample was immersed in a solution, which was obtained by mixing Chemical Copper 500A (manufactured by Okuno Chemical Industries Co., Ltd., diluted to 250 mL/L with distilled water) and Chemical Copper 500B (manufactured by Okuno Chemical Industries Co., Ltd., diluted to 250 mL/L with distilled water) at 1:1, at room temperature for 10 minutes, and then washed with distilled water for 5 minutes. Subsequently, the sample was subjected to vacuum drying at 90° C. for 12 hours to dry the water.

[X-Ray Condition]
X-ray target: Cu
X-ray tube voltage: 40 kV
X-ray tube current: 30 mA

[Imaging Condition]
Number of projections: 1500 sheets
Rotation angle: 180°
Exposure time: 20 seconds/sheet
Spatial resolution: 0.54 µm/pixel

[X-Ray CT Analysis Condition]

By using the median filter, the obtained three-dimensional images were processed in adjacent one pixel, and the processed images were binarized using the Otsu's algorithm.

Subsequently, Centerline Editor (Ver. 7) of Simpleware software manufactured by JSOL Corporation with default setting values was used to remove lines of 2.16 µm or less as noises, and then the number $N_n$ of node portions and the number $N_l$ of linear portions in a measurement field of view of 300 µm×300 µm×300 µm were determined.

With the above structural analysis, the number $N_n$ of node portions and the number $N_l$ of linear portions included in the specimen, the density of the node portions, and the average values of the orientation angles with respect to the three mutually orthogonal directions (x, y, z) were determined. The results are listed in Table 1. The orientation angles in Table 1 were obtained by setting the application direction of the compressive load as x direction and the directions perpendicular to the application direction of the compressive load as y direction and z direction.

<Evaluation of Diameter of Carbon Fiber>

The diameter d of a linear portion (carbon fiber) constituting the carbon foam was determined by an analysis of an image of a scanning electron microscope (SEM). Specifically, the carbon foam was observed at a magnification of 10,000 under a scanning electron microscope. Twenty locations were randomly selected on the obtained observation image, and the thicknesses of carbon fibers at these locations was measured. Assuming that the cross section is in a circular shape, the average thickness was calculated.

<Measurement of Ratio of Oxygen Atoms (% by Mass)>

The oxygen content of the carbon foam was determined from an X-ray fluorescence measurement. The X-ray fluorescence measurement was performed using an X-ray fluorescence analyzer ZSX-100E (wavelength dispersion type, Rh tubular lamp) manufactured by Rigaku Corporation. A size having a diameter of 20 mm or more was used as the sample.

The ratios of oxygen atoms before and after an oxidation treatment were measured using the samples before and after the oxidation treatment after a carbonization treatment in Examples and Comparative Examples.

<Evaluation of Carbon Content>

The carbon content of the carbon foam was determined from an X-ray fluorescence measurement. The X-ray fluorescence measurement was performed using the X-ray fluorescence analyzer ZSX-100E (wavelength dispersion type, Rh tubular lamp) manufactured by Rigaku Corporation. A size having a diameter of 20 mm or more was used as the sample.

The carbon contents before and after an oxidation treatment were measured using the samples before and after the oxidation treatment after a carbonization treatment in Examples and Comparative Examples.

<Number of Large Through Holes>

The number of large through holes having a diameter of 1 mm or more relative to the surface area of the carbon foam was evaluated by a visual inspection and an inspection by a pinhole inspection machine (a sheet inspection device manufactured by OMRON Corporation) to detect through holes.

Example 1

Two melamine resin foams (dimensions: 270 mm×270 mm×1 mm, manufactured by BASF under the product name of "BASOTECT W") as materials of carbon foams were stacked. Subsequently, a SUS plate of 0.2 mm in thickness was placed around the sample as a spacer. The sample was sandwiched between graphite plates each having a thickness of 10 mm, and was introduced into a vacuum press machine (KVHC-II) manufactured by KITAGAWA SEIKI CO., LTD. The temperature inside the press machine was raised to 360° C. at a temperature elevation rate of 5° C./min while the press machine was decompressed and evacuated by a vacuum pump, and the temperature was retained for 10 minutes. The sample was pressed under a pressure of 2.0 MPa while the temperature was raised and the temperature was retained at 360° C. Thereafter, the temperature inside the machine was lowered to 40° C. The vacuum pump was then stopped, and the press was released.

Thereafter, a graphite plate sized to 270 mm×270 mm×4 mm was placed on the pressed melamine resin foams to apply a compressive load of 70 Pa. The melamine resin foams were then introduced into a heat treatment furnace with the compressive load applied thereon. Subsequently, nitrogen gas was supplied into the furnace at a flow rate of 2.5 L/min, and the temperature in the furnace was raised to a heat treatment temperature of 1100° C. at a temperature elevation rate of 5° C./min. This state was retained for 1 hour to carbonize the pressed melamine resin foams. Subsequently, the temperature in the furnace was lowered to room temperature, and the carbonized melamine resin foams were taken out from the furnace. The carbonized melamine resin foams were then transferred to another heating furnace and heat treated at 300° C. for 1 hour under a stream of dry air flow rate of 1 L/min to obtain a stack carbon foam having oxidized surfaces. A stack carbon foam of Example 1 was prepared in this manner.

Details of the obtained carbon foam are listed in Table 1.

Example 2

Pressed melamine resin foams were obtained in the same manner as in Example 1 except that five sheets of melamine resin foams similar to those of Example 1 having dimensions of 270 mm×270 mm×1 mm were stacked, and that a SUS plate having a thickness of 0.5 mm was used as a spacer.

Subsequently, three graphite plates sized to 270 mm×270 mm×4 mm were placed on the pressed melamine resin foams to apply a compressive load of 210 Pa. The melamine resin foams were then introduced into a heat treatment furnace with the compressive load applied thereon. The furnace was decompressed and evacuated by a vacuum pump until the degree of vacuum inside the furnace became less than 1 Pa. Subsequently, nitrogen gas was supplied into the furnace at a flow rate of 2 L/min during decompression and evacuation. The temperature inside the furnace was raised to 800° C. at a temperature elevation rate of 5° C./min. The degree of decompression inside the furnace was about 700 Pa when the temperature inside the furnace reached 800° C. The supply of nitrogen gas was stopped once the temperature inside the furnace reached 800° C., and the temperature was raised to a heat treatment temperature of 1500° C. at a temperature elevation rate of 5° C./min and retained at 1500° C. for 1 hour to carbonize the pressed melamine resin foams. The degree of decompression inside the furnace was less than 10 Pa when the temperature inside the furnace reached 1500° C. Subsequently, the temperature inside the furnace was lowered to room temperature. The vacuum pump was then stopped, and the carbonized melamine resin foams were taken out from the furnace. The carbonized melamine resin foams were then transferred to another heating furnace and heat treated at 500° C. for 1 hour under a stream of dry air flow rate of 1 L/min to obtain a stack carbon foam having oxidized surfaces. A stack carbon foam of Example 2 was prepared in this manner.

Details of the obtained carbon foam are listed in Table 1.

Example 3

A stack carbon foam was produced in the same manner as in Example 2 except that two sheets of melamine resin foams similar to those of Example 1 having dimensions of 270 mm×270 mm×0.5 mm were stacked, and a spacer with a thickness of 0.1 mm was used.

Details of the obtained carbon foam are listed in Table 1.

Example 4

A stack carbon foam was produced in the same manner as in Example 2 except that ten sheets of melamine resin foams similar to those of Example 2 having dimensions of 270 mm×270 mm×1 mm were stacked, and a spacer with a thickness of 0.3 mm was used.

Details of the obtained carbon foam are listed in Table 1.

Example 5

A monolayer carbon foam was prepared in the same manner as in Example 2 except that one sheet of melamine resin foam having dimensions of 270 mm×270 mm×10 mm was pressed using a spacer with a thickness of 0.5 mm.

Details of the obtained carbon foam are listed in Table 1.

Example 6

Two sheets of monolayer carbon foams were produced in the same manner as in Example 2 except that each of sheets of melamine resin foam having dimensions of 270 mm×270 mm×5 mm was pressed using a spacer with a thickness of 0.5 mm. Thereafter, they were introduced into the vacuum press machine (KVHC-II) manufactured by KITAGAWA SEIKI CO., LTD., and a spacer was replaced with one with a thickness of 0.2 mm. The temperature inside the press machine was raised to 150° C. at a temperature elevation rate of 5° C./min while the press machine was decompressed and evacuated by a vacuum pump, and the temperature was retained for 10 minutes. The foams were pressed at a pressure of 2.0 MPa while the temperature was remained at 150° C. Thereafter, the temperature inside the machine was lowered to 40° C. The vacuum pump was then stopped, and the press was released to obtain a stack carbon foam.

Details of the obtained carbon foam are listed in Table 1.

Comparative Example 1

A monolayer carbon foam was produced in the same manner as in Example 1 except that one melamine resin foam having a dimension of 120 mm×90 mm×2 mm was used and carbon foams were not stacked.

When the carbonized monolayer carbon foam was taken out, a part of the carbon foam was torn.

Details of the obtained carbon foam are listed in Table 1.

Comparative Example 2

A monolayer carbon foam was produced by carrying out pressing and carbonization treatments in the same manner as in Example 3 except that one sheet of melamine resin foam having a dimension of 120 mm×90 mm×1 mm was used and carbon foams were not stacked.

When the carbonized monolayer carbon foam was taken out, the entire carbon foam was fallen apart.

Details of the obtained carbon foam are listed in Table 1.

TABLE 1

|  | Example 1 | Example 2 | Example 3 | Example 4 | Example 5 | Example 6 | Comparative Example 1 | Comparative Example 2 |
|---|---|---|---|---|---|---|---|---|
| Number of large through holes of diameter of ≥1 mm | 0 | 0 | 1 | 0 | 0 | 0 | 4 | — |
| Thickness of carbon foam (mm) | 0.1 | 0.25 | 0.05 | 0.15 | 0.25 | 0.25 | 0.1 | — |
| Ratio R ($N_l/N_n$) | 1.47 | 1.48 | 1.48 | 1.51 | 1.49 | 1.46 | 1.47 | — |
| Density of node portions (units per mm³) | 680000 | 660000 | 650000 | 3400000 | 1600000 | 780000 | 660000 | — |
| Diameter of carbon fiber (μm) | 2 | 2 | 2 | 2 | 2 | 2 | 2 | — |
| Average of orientation angles in x direction (°) | 62 | 62.2 | 61.9 | 60.7 | 61.5 | 62 | 61.7 | — |
| Average of orientation angles in y direction (°) | 55 | 55.1 | 55 | 55.7 | 55.5 | 55.2 | 55.3 | — |
| Average of orientation angles in z direction (°) | 55.8 | 55.5 | 56 | 56.2 | 55.3 | 55.6 | 55.9 | — |
| $\theta_c$ (°) | 7 | 7.1 | 6.9 | 5 | 6.2 | 6.8 | 6.4 | — |
| $\theta_d$ (°) | 6.2 | 6.7 | 5.9 | 4.5 | 6.0 | 6.4 | 5.8 | — |
| Presence of misaligned through holes | Yes | Yes | Yes | Yes | No | Yes | No | No |
| Presence of terminating holes | Yes | Yes | Yes | Yes | No | Yes | No | No |
| Ratio of oxygen atoms before oxidation (% by mass) | 4.9 | 0.1 | 0.1 | 0.1 | 0.1 | 0.1 | 5.1 | — |
| Carbon content before oxidation (% by mass) | 91.1 | 99 | 99 | 99 | 99 | 99 | 91.0 | — |
| Ratio of oxygen atoms after oxidation (% by mass) | 7.7 | 2.1 | 2.2 | 1.9 | 2.1 | 2.1 | 7.9 | — |
| Carbon content after oxidation (% by mass) | 87.1 | 97.8 | 97.7 | 98.0 | 97.8 | 97.8 | 86.9 | — |

REFERENCE SIGNS LIST

1 Stack carbon foam
2 One carbon foam
2a Outer edge of through hole in one carbon foam at contact surface
2b Outer edge of hole in one of carbon foam at contact surface
3 Other carbon foam
3a Outer edge of through hole in other carbon foam at contact surface
3b Outer edge of hole in other carbon foam at contact surface
4 Contact surface
51-52 Misaligned through holes
61-64 Terminating holes
71 Through hole

The invention claimed is:

1. An electrode comprising a stack carbon foam being a stack of at least two monolayer carbon foams stacked one another, each monolayer carbon foam comprising linear portions and node portions joining the linear portions,
   wherein a thickness of the stack carbon foam is 0.01 mm to 3.0 mm,
   wherein the stack carbon foam comprises a contact surface in which two adjacent monolayer carbon foams contact with each other, wherein the stack carbon foam comprises a through hole penetrating through the stack carbon foam in a cross section in a thickness direction of the stack carbon foam, and wherein the through hole is a hole extending continuously from one surface to the other surface in the thickness direction of the stack carbon foam.

2. The electrode according to claim 1, wherein an outer edge of the through hole in one monolayer carbon foam at the contact surface is misaligned with an outer edge of the through hole in another monolayer carbon foam at the contact surface, in the cross section in the thickness direction of the stack carbon foam.

3. The electrode according to claim 1, wherein the stack carbon foam further comprises a hole not penetrating through the stack carbon foam, the hole extending from a surface of one monolayer carbon foam to the contact surface and terminating at the contact surface, in the cross section in the thickness direction of the stack carbon foam.

4. The electrode according to claim 1, wherein a ratio of the number of the linear portions to the number of the node portions is 1.2 or more and 1.7 or less.

5. The electrode according to claim 4, wherein the ratio of the number of the linear portions to the number of the node portions is 1.4 or more and 1.6 or less.

6. The electrode according to claim 1, wherein a difference $\theta c$ between the largest value and the second largest value of $\theta avex$, $\theta avey$, and $\theta avez$ is 3° or more, where, for linear portions included in a region of 300 μm× 300 μm× 300 μm, an average value of orientation angles with respect to an x direction is defined as $\theta avex$, an average value of orientation angles with respect to a y direction is defined as $\theta avey$, and an average value of orientation angles with respect to a z direction is defined as $\theta avez$, where the thickness direction of the stack carbon foam is defined as the x direction, a direction perpendicular to the x direction is defined as the y direction, and a direction perpendicular to the x direction and the y direction is defined as the z direction.

7. The electrode according to claim 1, comprising a region having a density of the node portions of $15,000/mm^3$ or more.

8. The electrode according to claim 1, wherein a ratio of oxygen atoms determined by a surface analysis by X-ray fluorescence spectroscopy is 0.03% by mass to 10% by mass.

9. The electrode according to claim 1, wherein a carbon content is 51% by mass or more.

10. The electrode according to claim 1, formed into a sheet.

11. A method of manufacturing the electrode according to claim 1, comprising:

stacking and pressing a first resin foam and a second resin foam to form a stack resin foam; and carbonizing the stack resin foam to manufacture the stack carbon foam being a stack of a first monolayer carbon foam comprising linear portions and node portions joining the linear portions, and a second monolayer carbon foam comprising linear portions and node portions joining the linear portions.

12. A method of manufacturing the electrode according to claim 1, comprising:

stacking a first monolayer carbon foam comprising linear portions and node portions joining the linear portions, and a second monolayer carbon foam comprising linear portions and node portions joining the linear portions, to form a stack; and pressing the stack to manufacture the stack carbon foam.

13. The electrode according to claim 1, wherein thickness of the stack carbon foam is 0.01 mm to 1.0 mm.

* * * * *